A. S. HUBBARD.
STORAGE BATTERY.
APPLICATION FILED AUG. 3, 1912.
1,082,869.
Patented Dec. 30, 1913.
3 SHEETS—SHEET 1.
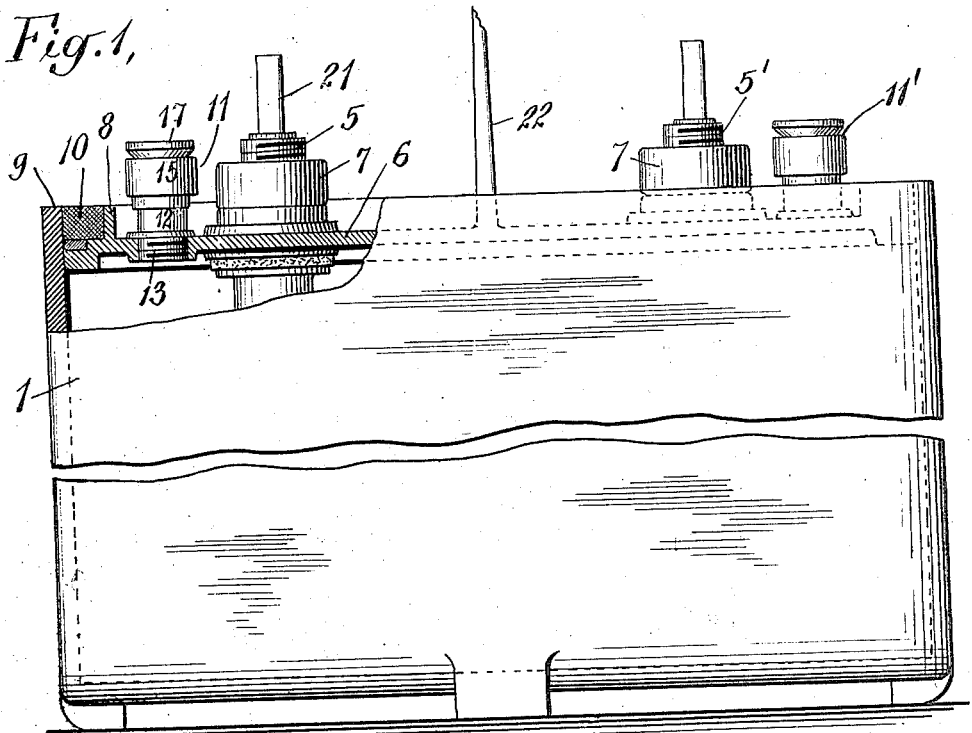
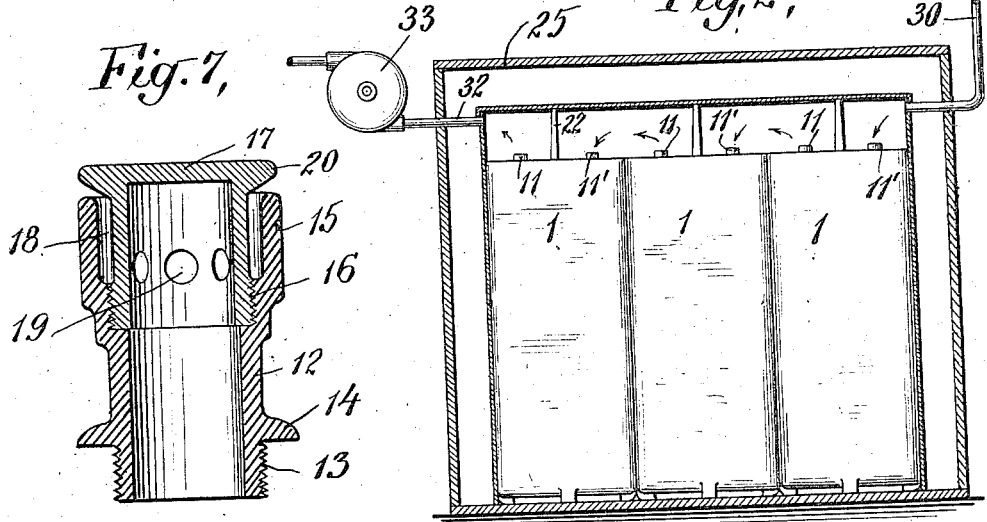
WITNESSES
INVENTOR
Albert S. Hubbard,
BY
Kenyon & Kenyon,
his ATTORNEYS

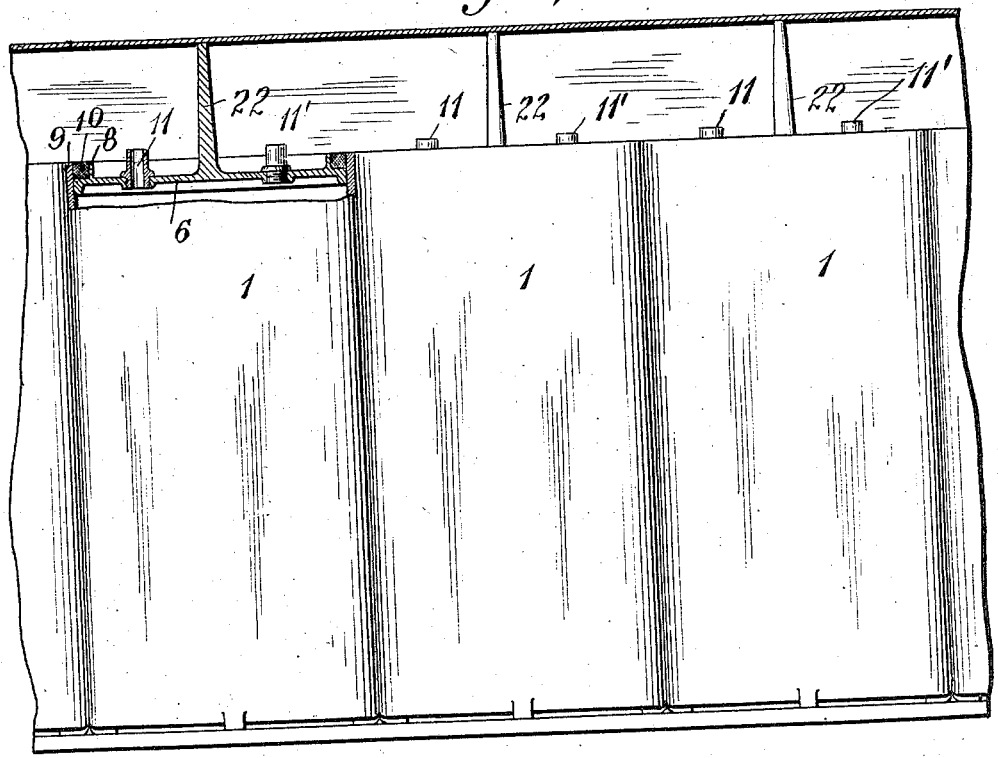
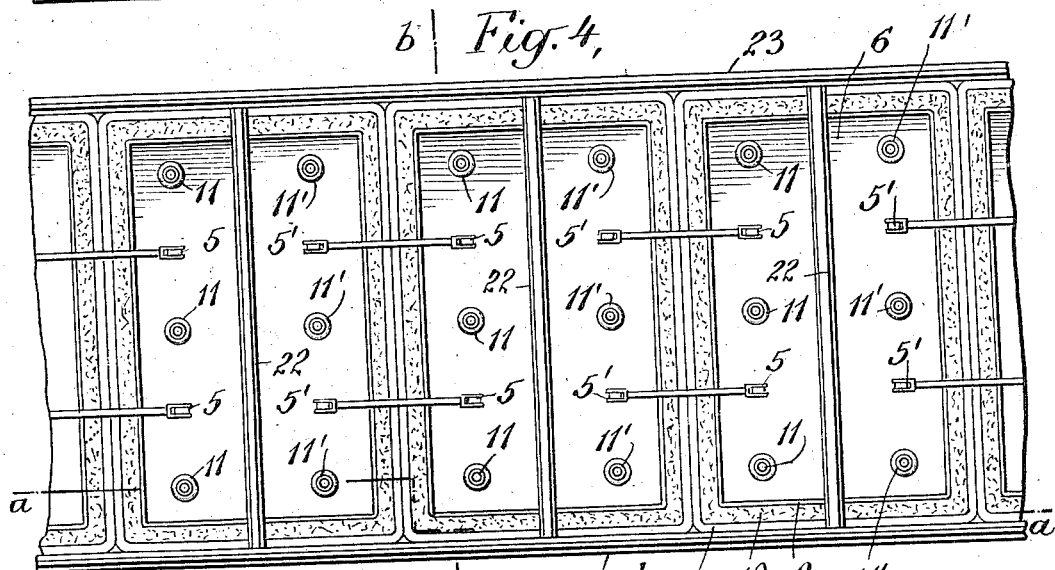

A. S. HUBBARD.
STORAGE BATTERY.
APPLICATION FILED AUG. 3, 1912.
1,082,869.
Patented Dec. 30, 1913.
3 SHEETS—SHEET 3.
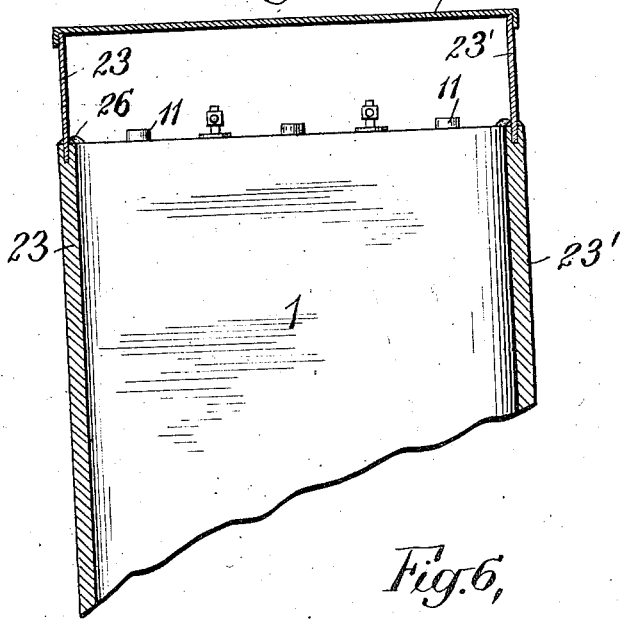
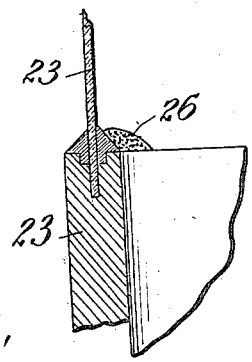
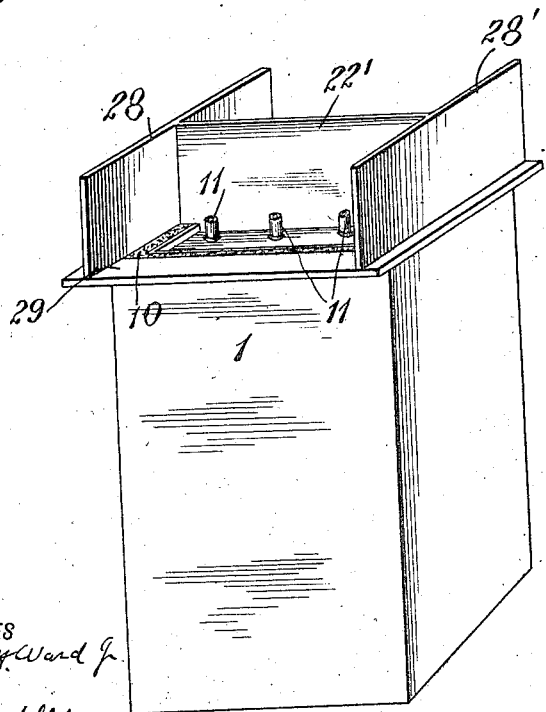
WITNESSES
Samuel H. Ward Jr.
J. O. Templer
INVENTOR
Albert S. Hubbard.
BY
Kenyon & Kenyon
his ATTORNEYS

UNITED STATES PATENT OFFICE.

ALBERT S. HUBBARD, OF GREENWICH, CONNECTICUT, ASSIGNOR TO GOULD STORAGE BATTERY COMPANY, A CORPORATION OF NEW YORK.

STORAGE BATTERY.

1,082,869.

Specification of Letters Patent. Patented Dec. 30, 1913.

Application filed August 3, 1912. Serial No. 713,036.

*To all whom it may concern:*

Be it known that I, ALBERT S. HUBBARD, a citizen of the United States, and a resident of Greenwich, county of Fairfield, and State of Connecticut, have invented a new and useful Improvement in Storage Batteries, of which the following is a specification.

My invention relates to storage batteries, and more particularly to the ventilation of storage batteries.

The invention is especially useful in connection with batteries for submarine work where each battery is sealed and the batteries arranged in an air-tight compartment where ventilation is essential; but the invention is useful in connection with batteries for other uses where the batteries are subjected to excessive temperatures or where it is desirable to place the batteries in a room or compartment and convey off the gases given off from the batteries.

One of the objects of the invention is to provide a durable and efficient vent duct for sealed batteries which will prevent the acid in the battery from slopping out when the boat is pitching or rolling in the trough of the sea.

Another object of the invention is to provide an efficient and readily installed ventilating conveyer for conducting off the gases from the different batteries in the compartment, and one which may be readily removed and replaced and which dispenses with piping connections through the battery compartment with branches to each jar.

The invention will be more readily understood and further objects of the invention will more fully appear from the following description taken in connection with the accompanying drawings forming a part of this specification and in which—

Figure 1 is a side elevation of a battery embodying certain features of the invention, with certain parts broken away and others in section; Fig. 2 is a sectional elevation taken through a compartment showing the batteries arranged and constructed for ventilation in accordance with one form of my invention; Fig. 3 shows a vertical section taken on line $a$—$a$ of Fig. 4; Fig. 4 shows a plan view of the batteries arranged for ventilation in accordance with one form of my invention and with the top of the ventilating conveyer removed; Fig. 5 is a sectional elevation taken on line $b$—$b$ of Fig. 4, but with the cover on the ventilating conveyer; Fig. 6 shows a perspective view of a jar embodying a modification; Fig. 7 shows an enlarged cross-sectional view of a novel form of vent duct; and Fig. 8 shows a detail.

Referring to the drawings, 1 is a battery jar, preferably of hard rubber, containing the usual positive and negative plates (not shown) which are respectively connected to the positive and negative terminals 5—5' which project through a cover 6 and are provided with suitable bushings and lock nuts 7. The cover is provided with an upright flange 8 extending around near its outer edge so as to form, with the edge of the jar above the cover, a trough 9 in which is poured a suitable cementing compound 10 for sealing the cover on the jar. The cover is provided, preferably near two of its opposite edges with ventilating ducts 11—11' for conveying off the gases from the jar when used with natural ventilation, and for admitting and conveying off gases, as hereinafter explained, when used with forced draft ventilation. The ventilating ducts are preferably in the form of a hollow tubular member 12 having a lower threaded portion 13 which screws into the cover, a lateral flange 14 extending around the tubular member above the threaded portion to form a tight joint with the cover. The upper end 15 of the tubular member 12 is expanded, and at the base of the expanded portion suitable threads 16 are formed into which a tubular cap piece 17 is screwed. The walls of the cap piece form, with the inner surface of the expanded portion, a trough 18 surrounding the cap piece and communicating with the duct through vent openings 19 formed in the walls of the cap piece at the base of the trough. The cap piece is preferably provided with a lateral annular flange 20 extending over the trough just above the top of the same. By using a ventilating device as above described, when the boat rolls in the trough of the sea, causing the acid to wash up in the ventilating duct, any acid that reaches the vent openings 19 will be caught in the trough 18 and returned to the jar through the vent openings, the lateral flange 20 preventing any of the acid which is caught in the trough from being splashed over the edges of the same in very rough weather. It is important that the vent ducts should extend high enough above the cover to prevent the liquid as a mass, or in excessive quantities, from reaching the top of the duct, and to avoid this I have found it necessary to extend the duct above the height of the edge of the jar; but in order to keep the ducts out of the way of the terminal connections, it is important that the tops of the ducts should not project up to the part 21 of the terminals to which the connections are made.

In submarine work, the batteries are usually arranged in rows in an air-tight compartment and held in position by a cementing compound or other suitable means; and in order to ventilate the batteries in the compartment, it has been proposed to run a pipe into the compartment and from this pipe, to run one or more branches to each of the separate jars. I propose to dispense with this network of pipes with its accompanying inconveniences, by placing the jars close together in a row and providing each jar with a vertical rib 22, preferably formed integrally with the cover and extending up above the terminals and across the jar so that the edges of the rib are flush with the sides of the jar. Longitudinal side pieces 23—23' are then placed along the sides of the jar, extending up above the sides of the ribs, substantially the height of the top of the ribs, so as to form, with the covers of the jars, a ventilating passageway or conveyer divided into sections by the ribs, there being one rib to each jar extending between the intake and outlet ducts 11—11'. The passageway is provided with a suitable detachable cover 25 made of glass, hard rubber, or other suitable material, and preferably fitted over the upper edges of the side pieces by means of a flange, as shown in Fig. 5. If desired, a suitable sealing compound 26 (Fig. 8) may be poured in between the side pieces 23—23' and the edges of the jar and the ribs, as well as between the abutting edges of the jar, thus dispensing with the necessity of having the bottoms of the jars arranged and set in place so as to be air-tight.

The side pieces 23—23' are preferably made of wood with a strip of glass extending above the edges of the jar and constituting the sides of the ventilating conveyer. If desired, the jars may be formed with their side walls 28—28' extending up above the top of the cover and flush with the ribs 22' so as to take the place of the side pieces 23—23'. If desired, the jars may be provided, as in Fig. 6, with a lateral flange 29 extending around the top of the rim so as to leave an air space between the jars below the abutting flanges when the jars are placed in a row for the purpose of passing air between the outer surfaces of the jars. When the jars have been suitably arranged in the compartment as above described, a suitable air intake pipe 30 is connected to the ventilating conveyer at one end and a suitable outlet pipe 32 is connected at the other end and provided with a fan 33 for drawing air through the conveyer. As the fan is started up, air is drawn through the pipe 30 into the first section of the ventilating conveyer through the intake ducts 11' into the jar and out through the outlet ducts 11 through the second section of the conveyer and into the next jar, etc., thus causing the air to pass through each of the jars of the series. Obviously, it is immaterial whether the air is forced through the passageway and the jars by means of a suction blower as herein shown, or by a pressure blower.

While I have shown and described my invention in the best form now known to me, it will be obvious to those skilled in the art that various modifications and changes may be made in the arrangement and construction of the parts without departing from the scope or spirit of the invention, and I do not wish to be understood as limiting myself other than as indicated in the appended claims.

I claim—

1. The combination of a series of storage batteries having covers provided with inlet and outlet vent ducts, a ventilating passageway extending along the battery jars and into which the vent ducts project at intervals along its length, and substantially air-tight partitions dividing the passageway into sections, each section containing an inlet vent duct from one jar and an outlet vent duct from an adjacent jar, whereby air forced through the passageway is made to pass through the jars of the series.

2. The combination of a series of storage batteries having covers provided with inlet and outlet vent ducts, a ventilating substantially air-tight passageway extending along the tops of the covers of the jars and into which the vent ducts from the jars project at intervals along its length, and substantially air-tight partitions between the inlet and outlet ducts of each jar dividing the passageway into sections, whereby air forced through the passageway passes through the jars of the series.

3. The combination of a series of storage batteries each provided with a cover, each cover being provided with an upwardly projecting rib extending across the jar and with inlet and outlet vent ducts arranged respectively on opposite sides of the rib, side pieces extending along the sides of the jars and projecting above the covers and along the ends of the ribs, and a cover for the passageway extending across the ribs and between the side pieces and forming therewith and with the tops of the jars a ventilating passage divided into sections.

4. The combination of a series of storage batteries each having a cover provided with inlet and outlet air ducts, a substantially air-tight ventilating passageway extending along the tops of the jars and into which the vent ducts open, the jars being placed one against the other so that the covers of the jars form the floor of the ventilating passage, and substantially air-tight partitions dividing the passageway into sections, each section containing an inlet vent of one jar and an outlet vent of an adjacent jar.

5. The combination of a series of storage batteries each provided with a cover, each cover being provided with an upwardly projecting rib extending across the jar and with inlet and outlet vent ducts arranged respectively along the abutting edges of adjacent jars, side pieces extending along the sides of the jars and projecting above the covers and forming substantially air-tight joints with the ends of the ribs and covers, and a cover for the passageway extending across the ribs and between the side pieces and forming therewith and with the tops of the jars a ventilating passage divided into sections.

6. The combination with a storage battery jar and a cover fitting thereon, of a vent duct extending up through the cover and closed at its upper end and provided with one or more vent openings above the cover of the jar, and a surrounding flange extending upwardly from the duct at a point below the vent openings and extending above the same to form with the walls of the duct a trough for catching and returning to the jar any acid that may slop out through the vent openings.

7. In a ventilating structure for covered storage batteries, the combination of a gas-conveying duct extending through the cover and closed at its upper end, a lateral annular flange surrounding the upper end of the duct, and a cup-like flange projecting upwardly from the duct and surrounding the same to form therewith an annular trough below the lateral flange, the duct having vent openings into the trough whereby acid slopping through the openings is caught and returned to the jar.

8. In a ventilating structure for covered storage batteries, the combination of a gas-conveying duct extending through the cover and closed at its upper end, a cup-like flange projecting upwardly from the duct and surrounding the same to form therewith an annular trough, the duct having vent openings into the trough, and a lateral annular flange on the duct just above the trough and extending over the same, so as to permit the passage of gases between it and the upper edge of the trough, but preventing the acid in the jar from slopping out over the trough.

9. A ventilating structure for closed storage batteries comprising a hollow member extending through the cover and having an open expanded upper portion, a hollow cap piece projecting up within and above the expanded portion and forming therewith a trough, the walls of the cap piece having openings into the trough, and a lateral flange around the cap piece and extending over the trough.

10. A ventilating structure for closed storage batteries comprising a tube extending through the cover and having an open expanded upper portion, a tubular cap piece removably secured to the tube below the top of the expanded portion and forming therewith a trough surrounding the cap piece, the cap piece being provided with a vent below the top of the trough, and a lateral flange surrounding the cap piece just above the top of the trough and extending over the same.

11. The combination of a closed storage battery having the top of the battery jar extending above the cover so as to form an upright flange around the same, terminals from the battery-plates extending through the cover, a vent duct extending up through the cover and closed at its upper end and having one or more vent openings above the cover, and a surrounding flange extending upwardly from the duct at a point below the vent openings and extending above the same to form with the walls of the duct a trough for catching and returning to the jar any acid that may slop out through the vent openings, the top of the vent structure extending above the top of the jar but below the connecting point on the terminals of the jar, whereby the projecting vents do not interfere with connections to the terminals.

12. A ventilating structure for closed storage batteries comprising a hollow member extending through the cover and having an open expanded upper portion, a hollow cap piece threaded into the hollow member and projecting up within and above the expanded portion and forming therewith a trough, the walls of the cap piece having openings into the trough, and a lateral flange around the cap piece and extending over the trough.

In testimony whereof, I have signed my name to this specification, in the presence of two subscribing witnesses.

ALBERT S. HUBBARD.

Witnesses:
A. T. SAP,
W. H. HIRSCHMANN.